US011808359B2

(12) United States Patent
Rasmussen

(10) Patent No.: US 11,808,359 B2
(45) Date of Patent: Nov. 7, 2023

(54) FLEXIBLE SEALING MEMBRANE AND SEAL ASSEMBLY FOR ROTARY SHAFT EQUIPMENT

(71) Applicant: John Crane Inc., Chicago, IL (US)

(72) Inventor: Darin Merrill Rasmussen, Palatine, IL (US)

(73) Assignee: JOHN CRANE INC., Chicago, IL (US)

( * ) Notice: Subject to any disclaimer, the term of this patent is extended or adjusted under 35 U.S.C. 154(b) by 0 days.

(21) Appl. No.: 17/360,288

(22) Filed: Jun. 28, 2021

(65) Prior Publication Data

US 2022/0136607 A1  May 5, 2022

Related U.S. Application Data

(60) Provisional application No. 63/109,434, filed on Nov. 4, 2020.

(51) Int. Cl.
*F16J 15/38* (2006.01)
*F16J 15/34* (2006.01)

(52) U.S. Cl.
CPC ............ *F16J 15/38* (2013.01); *F16J 15/3464* (2013.01)

(58) Field of Classification Search
CPC .... F16J 15/348; F16J 15/3452; F16J 15/3464; F16J 15/36; F16J 15/363
See application file for complete search history.

(56) References Cited

U.S. PATENT DOCUMENTS

| | | | | |
|---|---|---|---|---|
| 2,717,790 A | * | 9/1955 | Chambers, Jr. | F16J 15/36 277/379 |
| 2,724,603 A | * | 11/1955 | Toth | F16J 15/36 277/372 |
| 2,984,505 A | | 5/1961 | Andresent et al. | |
| 3,018,112 A | * | 1/1962 | Amirault | F16J 15/36 277/392 |

(Continued)

FOREIGN PATENT DOCUMENTS

GB    1342751    1/1974

OTHER PUBLICATIONS

Notification of Transmittal of the International Search Report and the Written Opinion of the International Searching Authority, or the Declaration; PCT/IB2021/056464; dated Oct. 25, 2021, 15 Pages.

*Primary Examiner* — Nicholas L Foster
(74) *Attorney, Agent, or Firm* — CANTOR COLBURN LLP

(57) ABSTRACT

A mechanical seal assembly adapted for arrangement around a rotating shaft of a rotating device and has first and a second seal rings. The assembly also includes an annular carrier having a base and a removable end portion configured to be affixed to a housing of the rotating device. The assembly also includes an annular flexible sealing membrane. The membrane includes an outer portion arrangeable between the first seal ring and a biasing mechanism and that is axially shiftable relative to the rotating shaft. The membrane also includes an inner portion surrounded by the outer portion and positioned between the base and the removable end portion of the annular carrier and the base and a removable end portions hold the inner portion in fixed relative to the annular carrier as the outer portion shifts relative to the rotating shaft.

12 Claims, 7 Drawing Sheets

(56) References Cited

U.S. PATENT DOCUMENTS

| | | | | |
|---|---|---|---|---|
| 4,451,049 A | * | 5/1984 | Charhut | F16J 15/36 |
| | | | | 277/374 |
| 6,145,841 A | * | 11/2000 | Maeda | F16J 15/348 |
| | | | | 277/358 |
| 10,634,250 B2 | * | 4/2020 | Rasmussen | F16J 15/32 |
| 2016/0230892 A1 | * | 8/2016 | Yoshino | F04D 29/128 |
| 2018/0017161 A1 | * | 1/2018 | Rasmussen | F16J 15/002 |
| 2019/0331227 A1 | | 10/2019 | Itadani et al. | |
| 2020/0232562 A1 | | 7/2020 | Rasmussen et al. | |
| 2022/0205540 A1 | * | 6/2022 | Wasser | F16J 15/344 |
| 2022/0333691 A1 | * | 10/2022 | Rasmussen | F16J 15/36 |
| 2023/0074820 A1 | * | 3/2023 | Tirunagari | F16J 15/36 |

\* cited by examiner

FLEXIBLE SEALING MEMBRANE AND SEAL ASSEMBLY FOR ROTARY SHAFT EQUIPMENT

DOMESTIC PRIORITY

The present application claims the benefit of U.S. Provisional Application No. 63/109,434 filed Nov. 4, 2020, which is hereby incorporated herein in its entirety by reference.

TECHNICAL FIELD

This invention relates to rotary shaft equipment having mechanical seal assemblies providing a seal between a housing and rotatable shaft of the rotary shaft equipment. More particularly, it relates to such rotary shaft equipment and seal assemblies that include a secondary sealing membrane.

BACKGROUND

Mechanical seals are used to provide a seal between a rotating shaft and a stationary housing of a pump, compressor, turbine, or other rotating machine. End face mechanical seals generally include a primary seal interface comprising two relatively rotatable seal faces defined or otherwise carried by so called "primary" and "mating rings." Frictional wear between the seal faces can cause a gap to form therebetween, leading to excessive leakage. Accordingly, some end face seals require regular adjustment in order to maintain the appropriate or axial position of an axially shiftable seal member (also known as "seal height") in order to account for such wear.

Various biasing mechanisms have been contemplated to provide a closing force to automatically accommodate wear. Such biasing mechanism have included single and multiple coil springs, and metal bellows.

Pusher seal assemblies comprise a dynamic secondary seal (such as an o-ring) to provide a seal between the shaft and the seal members themselves. The dynamic secondary seal of pusher seals is generally configured to move axially with the axially shiftable seal member/primary ring. This axial movement relative to the shaft can cause fretting or shredding of the secondary seal due to friction.

Non-pusher seals generally feature a secondary shaft seal that is not intended to move axially relative to the shaft, such as an o-ring (generally used with metallic bellows seals), or an elastomeric bellows, an example of which is provided in FIG. 1. The depicted mechanical seal comprises an elastomeric bellows that is driven to rotate with the shaft relative to the housing. This non-pusher seal can reduce torque stress on the bellows, which are intended to contract and expand to balance the opening and closing forces on the seal faces. At high pressures, such as gauge pressures above about 70 bar (g), however, the shaft itself can translate axially. This can create an axial load on the elastomeric bellows which can cause the elastomer to rigidly collapse, as shown in the detail view (where lighter areas are those with higher pressure). This axial rigidity prevents the bellows from effectively counteracting the closing force provided by the biasing members, leading to excess face pressure, frictional wear, and eventual seal failure.

Ongoing demand for improved productivity, reliability, durability and changing envelope requirements for pumps and other rotary shaft equipment dictate continued effort for new developments in seal assemblies. In particular, a need exists for mechanical seals that can operate to seal higher internal pressures. The present disclosure relates to an advance in seal technology that addresses these needs.

SUMMARY

Embodiments of the present disclosure meet the need for mechanical seals that can operate to seal higher internal pressures by providing a flexible sealing membrane for incorporation in a mechanical seal assembly and use in rotary shaft equipment.

The flexible sealing membrane can be implemented, generally, as a ring that includes an outer, substantially radially extending portion, which can be urged into an axially shiftable ring by seal components such as a plurality of axially spaced springs. This first portion is generally non-collapsible and surrounds an inner portion that is generally thinner than the outer portion. In operation, movement of the primary ring relative to the shaft will result in deflection of the outer portion relative to the inner portion and in some cases, the rotating shaft of the rotary shaft machine.

In an embodiment, the sealing membrane comprises a flexible elastomer.

In one embodiment, a mechanical seal assembly adapted for arrangement around a rotating shaft of a rotating device is disclosed. The mechanical seal assembly includes a first seal ring that, in operation, is axially shiftable relative to the rotating shaft and a second seal ring that, in operation, is axially fixed relative to the rotating shaft. The assembly also includes an annular carrier having a base and a removable end portion configured to be affixed to a housing of the rotating device. The axially shiftable first seal ring is proximate and axially shiftable relative to the annular carrier in response to axial movement of the rotating shaft and the axially fixed second seal ring and the axially shiftable first seal ring has an axially shiftable seal face that interfaces with an axially fixed seal face of the axially fixed second seal ring. Also includes is a biasing mechanism that urges the axially shiftable first seal ring toward the axially fixed second seal ring to engage the axially shiftable seal face to the axially fixed seal face with a closing force and an annular flexible sealing membrane.

The sealing membrane can be any membrane disclosed herein. For example, the sealing membrane can include an outer portion arrangeable between the axially shiftable first seal ring and the biasing mechanism and that is axially shiftable relative to the rotating shaft. The membrane can also include an inner portion surrounded by the outer portion and positioned between the base and the removable end portion of the annular carrier. In at least one embodiment, the base and the removable end portions hold the inner portion fixed relative to the annular carrier as the outer portion shifts relative to the rotating shaft.

In any prior embodiment, the base can have an upper surface with a depression formed therein that is arranged proximate the outer portion of the annular flexible sealing membrane.

In any prior embodiment or alternatively, the removable end portion can have an upper surface with a depression formed therein that is arranged proximate the outer portion of the annular flexible sealing membrane.

In any prior embodiment or alternatively, the outer portion presents a thicker cross-section than a cross-section of the inner portion.

In any prior embodiment or alternatively, the biasing mechanism comprises an axially shiftable annular retainer proximate the outer portion and a plurality of radially spaced spring members arranged between the annular carrier and the retainer.

In any prior embodiment or alternatively, the assembly can further comprise a rotating sleeve operably coupled to the rotating shaft for rotation therewith and wherein the axially fixed second seal ring is operably coupled to the sleeve. In any prior embodiment or alternatively, wherein the axially fixed second seal ring is operably coupled to the sleeve by a plurality of pins.

In any prior embodiment or alternatively, the sealing membrane can comprise a flexible elastomer.

In any prior embodiment or alternatively, the seal assembly can further comprise an anti-extrusion ring within a groove of the axially shiftable first seal ring.

In any prior embodiment or alternatively, the anti-extrusion ring can comprise a material of a greater hardness than the flexible elastomer of the sealing membrane.

In any prior embodiment or alternatively, the seal assembly can further comprise a gland plate adapted to connect to the housing and the carrier can be connected to the gland plate.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures wherein.

Figure 1:
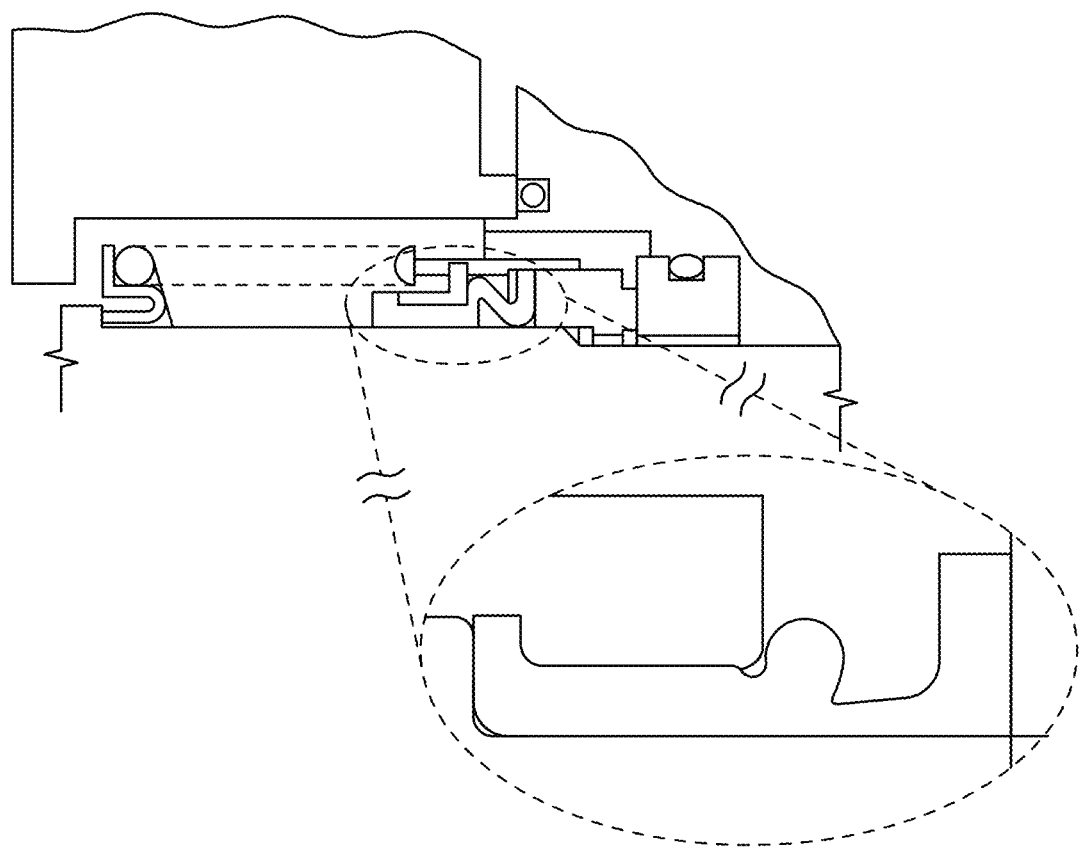
FIG. 1 is a cross-sectional view depicting a portion of a seal assembly and detail of an elastomeric bellows as is known in the art.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 2:
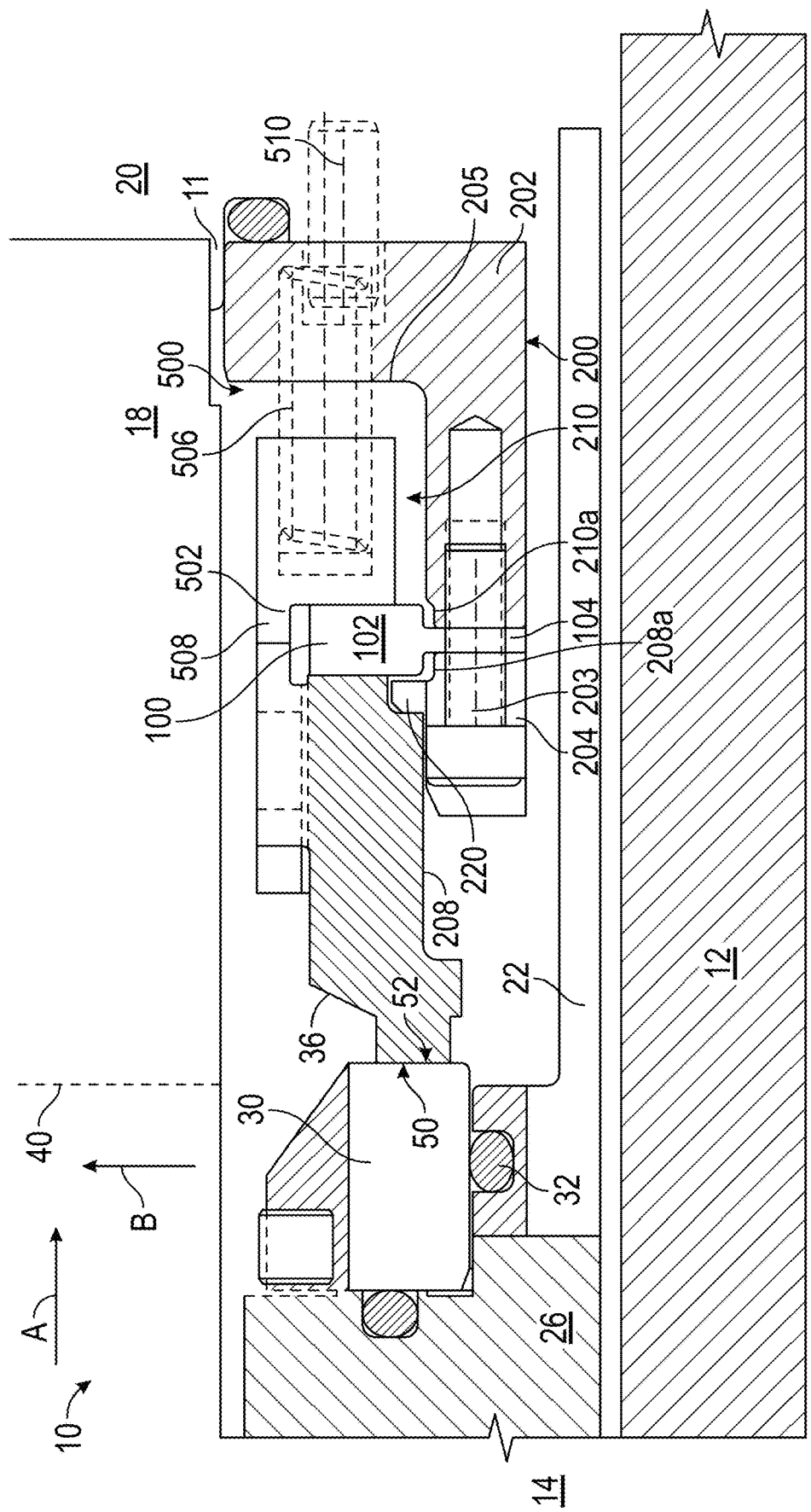
FIG. 2 is a cross-sectional view depicting a portion of a seal assembly according to an embodiment.

FIG. 2 is a cross-sectional views depicting a portion of a seal assembly 10 including a flexible sealing membrane 100 depicted in conjunction with an article of rotary shaft equipment such as a pump, mixer, blender, agitator, compressor, blower, fan, or the like, according to an embodiment of the present disclosure.

As is common for seal assemblies of this type, seal assembly 10 can seal a rotating, axially extending, shaft 12 of an article of rotary shaft equipment. Seal assembly 10 can provide a seal for the process chamber 14 at the inboard extent of the seal assembly 10 with respect to the ambient surroundings 16.

The seal assembly 10 can be arranged coaxial of the shaft 12 in a bore defined by an annular housing 18 (e.g., a body of a rotary machine) coaxial of the shaft 12. Various stationary (or non-rotating) components of seal assembly 10 can be operably coupled to the housing 18 or another element such as a gland plate generally indicated by reference number 20, which is in turn also operably coupled to housing 18.

Various rotating components can be operably coupled to shaft 12, for rotation therewith. An annular sleeve member 22 is secured to the shaft 12 for rotation therewith. An annular flange formation 26 extends radially outwardly of the sleeve member 22 at the end thereof adjacent the process chamber 14.

An axially fixed seal ring 30 (or mating ring) is mounted on the face of the annular flange formation 26 remote from the process chamber 14, for rotation therewith. Annular o-ring 32 provides a resilient secondary seal between sleeve member 22 and axially fixed seal ring 30. In embodiments, more or fewer secondary sealing o-rings may be present. Axially fixed seal ring 30 includes outboard sealing face 50.

An axially shiftable seal ring 36 (or primary ring) is arranged outboard and adjacent to axially fixed seal ring 30. Axially shiftable seal ring 36 includes inboard sealing face 52. Inboard sealing face 52 abuts outboard sealing face 50.

While, as depicted and described, axially shiftable seal ring 36 is stationary and axially fixed seal ring 30 is rotatable, in embodiments, the relative axial movement can be provided by either the rotating or stationary seal ring.

Inlet 40 can be defined within housing 18 and/or gland plate 20 to provide a sealing lubricant (not shown) to sealing faces 50 and 52.

In the following discussion, direction A shall be referred to as the outboard direction (with the opposite direction being inboard direction) and direction B shall be referred to as the radially outward direction).

Figure 3B:
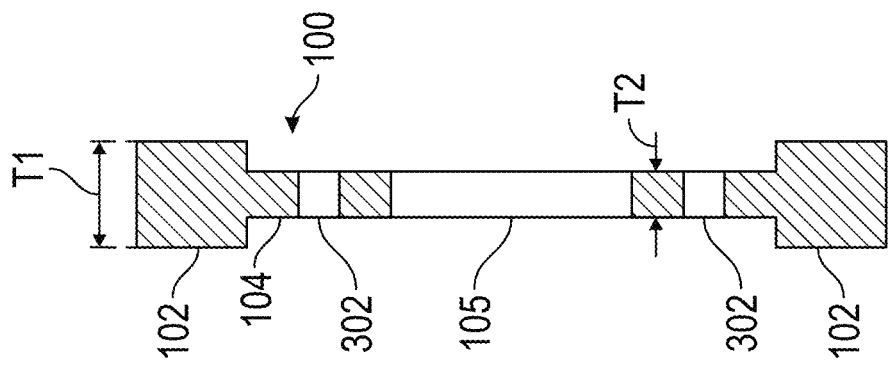
FIG. 3B a cross-sectional view depicting a detail of sealing membrane according to an embodiment.

A sealing membrane 100 can present a generally dumbell-shaped cross-section, comprising an outer portion 102 and an inner portion 104 surrounded by the outer portion 102. An inboard face of outer portion 102 can abut outboard face of the axially shiftable seal ring 36, creating a pressure tight seal. The outer portion 102 can tilt or otherwise move relative to the inner portion as the axially shiftable ring 36 moves. As shown in FIG. 3B, the inner portion 104 can present a thinner cross section than the outer portion 102 to enable such relative movement.

The inner portion 104 is fixed to and held by an annular carrier 200. In more detail, the annular carrier 200 can be connected to the housing 18 or the gland plate 20 and a provides a stable and generally non-moveable base for a biasing mechanism 500 discussed below.

The illustrated annular carrier 200 is illustrated as including two portions, a primary or base portion 202 and a removable end portion 204 that can be attached to the base portion 202 by, for example, a fastener 203. The annular carrier 200 and the fastener 203 can comprise steel or stainless steel in embodiments.

The base portion 202 and the removable end portion 204 can be sized and arranged such that hold the sealing membrane 100. As illustrated, the inner portion of the sealing membrane is disposed between the base portion 202 and the removable end portion 204 in such a manner that the inner portion 204 does not move relative to the base portion 202 or the housing 18. More details of the sealing membrane 100 are discussed below.

An annular anti-extrusion ring 220 can be present in an annular groove of axially shiftable seal ring 36 and abut or be proximate to the outer portion 104 or other portions of the sealing member 100 and the annular carrier 200. The annular anti-extrusion ring 220 can comprise a harder elastomer than sealing membrane 100, such as a 50 to 55 (Shore D) durometer carbon filled polytetrafluoroethylene (PTFE). In one embodiment, because extrusion is most likely at the balance diameter of the seal, the inner diameter of anti-extrusion ring 220 can be arranged at the balance diameter of the seal assembly 10.

The biasing mechanism 500 can abut the outer portion 102 of the sealing member 100. Biasing mechanism 500 can comprise an axially shiftable annular retainer 502, the fixed carrier 200, and one or more biasing members 506 spanning therebetween. The retainer 502 can be arranged proximate to the outer portion 102. The retainer 502 can present a protrusion 508, extending axially inboard outside the outer diameter of outer portion 102. The protrusion 508 can be radially spaced from the outer face of outer portion 102. The primary base portion of the fixed carrier 200 can be axially and rotationally fixed to gland plate 20 by one or more pins 510, though other fixation mechanisms can be used. The biasing members 506 can comprise one or more radially spaced springs, though other biasing mechanisms known in the art can be used. In embodiments, one or both of retainer 502 and the base portion 202 can include bores adapted to house at least part of each biasing member 506, such that biasing members 506 are partially located within retainer 502 and base portion 202.

Those of ordinary skill in the art will appreciate that the arrangement depicted in FIG. 2 includes components that may be altered or eliminated in other seal assembly embodiments. In addition, more or fewer components may be incorporated in other embodiments of seal assemblies according to the present disclosure.

In operation, rotation of the shaft 12 can drive sleeve member and axially fixed seal ring 30 to rotate relative to axially shiftable seal ring 36. Seal lubricant (not shown) can be provided to seal 10 through one or more inlets 40 provided in housing 18 to lubricate the seal sealing faces 50 and 52 and to create a pressure gradient across sealing faces 50 and 52.

The pressure gradient and hydraulic pressure created by the relative rotation of the sealing faces 50 and 52 can result in an opening force, urging axially shiftable seal ring 36 axially outboard (direction A) from the axially fixed seal ring 30. Similarly, a closing force can be provided by the biasing mechanism 500, urging axially shiftable seal ring 36 inboard toward axially fixed seal ring 30.

Those of ordinary skill in the art will appreciate that the closing force at a seal face interface can be calculated from the closing area (AC), the opening area (AO), the outer diameter of the stationary ring face (OD), the inner diameter of the stationary ring face (ID) and the balance diameter (BD), as detailed below:

$$\text{Closing Force} = \left(\frac{AC}{AO}\right) \times \text{Hydraulic Pressure}$$

$$\text{where } AC = \frac{OD^2 - BD^2}{OD^2 - ID^2}$$

The outer portion 102 can shift (or otherwise translate) axially and radially based on the relative closing and opening forces, and the axial translation of the shaft itself, such that the closing force applied to axially shiftable seal ring 36 is constant, regardless of the position of outer portion 102.

Figure 3A:
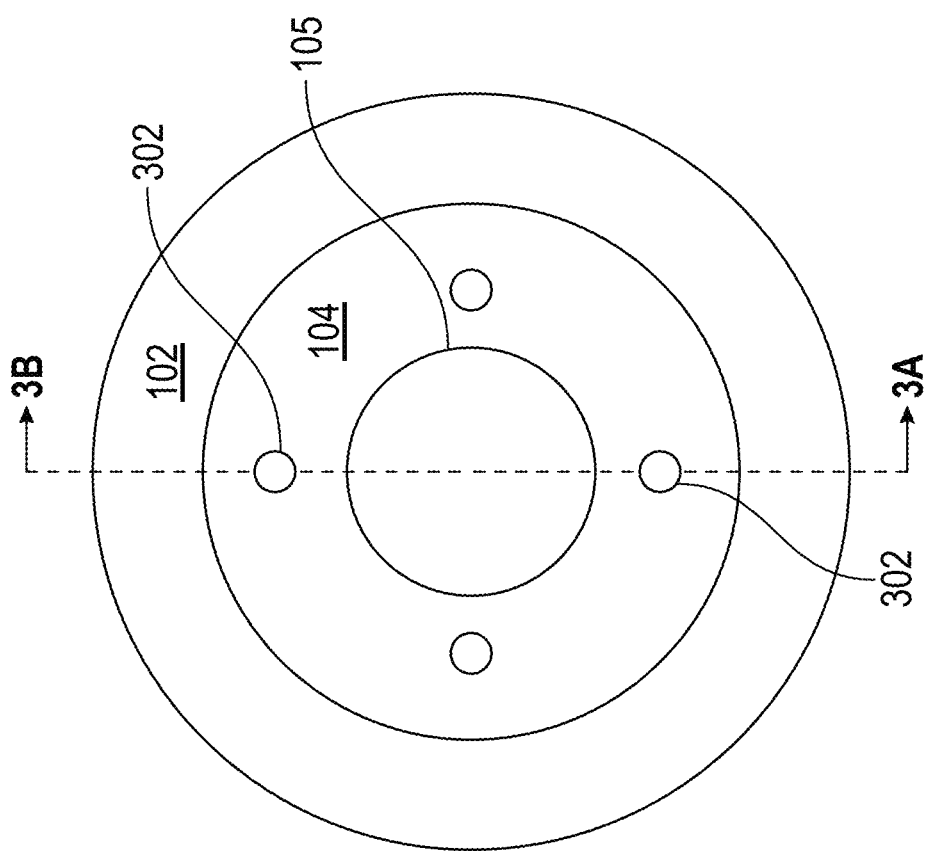
FIG. 3A is a top view of a sealing membrane according to an embodiment.

FIGS. 3A and 3B show an example sealing member 100 according to one embodiment and a cross-section thereof, respectively. The sealing member 100 includes the outer portion 102 and the inner portion 104. The inner portion 104 has a first thickness T1 and the inner portion 104 has a second thickness T2. T1 is greater than T2 in one embodiment. In one embodiment, T1 is three times larger than T2.

As discussed above and with further reference to FIG. 2, motion of the shiftable seal ring 36 will cause the outer portion 102 to move axially inboard/outboard. The difference in thickness between the inner and outer portions 102, 104 will allow for such flexion while the inner portion is held axially fixed relative to the housing 18 by the fixed/annular carrier 200.

Figure 4:
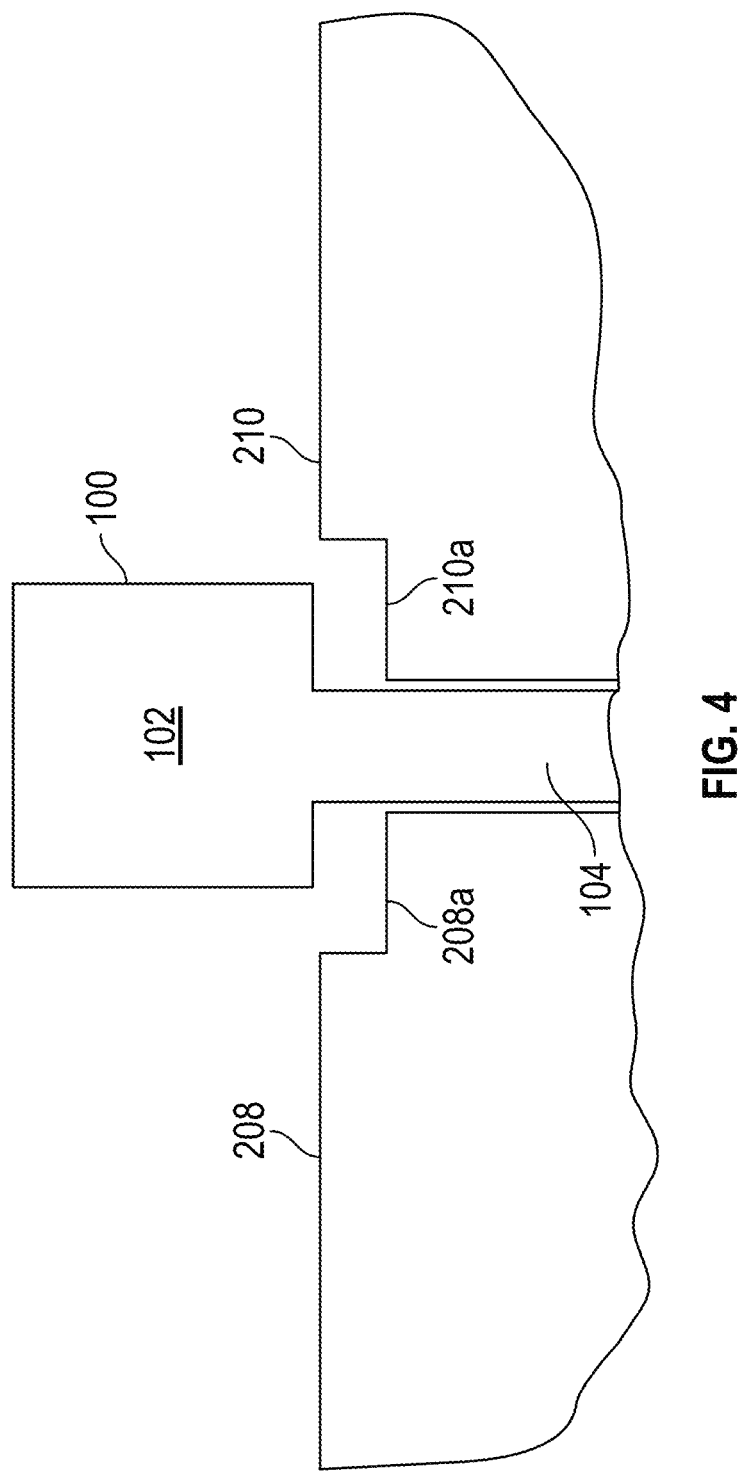
FIG. 4 is a more detailed depiction of a portion of the seal of FIG. 3.

With reference to FIGS. 2 and 4, the annular carrier 200 can include one or more depressions formed radially outward surfaces thereof that allow for the movement of the outer portion 102 of the sealing member 100. In particular, the base 202 of the annular carrier 200 includes an outer surface 210 that has a depression 210a formed therein that is arranged, in operation, near the outer portion 102. Similarly, the removable end portion 204 of the annular carrier 200 includes an outer surface 208 that has a depression 208a formed therein that is arranged, in operation, near or proximate the outer portion 102. These depressions are optional but may allow for easier relative movement of the outer portion 102 relative to the inner portion 104 as the primary ring 36 moves. The depressions 208a/210a can, individually or collectively, define a flange travel region 214. Further, in some embodiments, only one of the depressions may be provided.

Figure 5B:
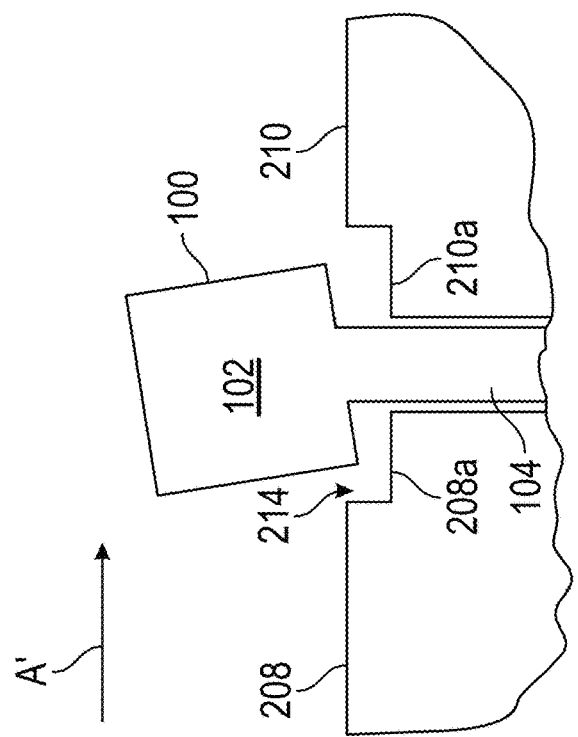
FIGS. 5A and 5B show deflection of the outer portion of the membrane as in two different shifted positions.
Figure 5A:
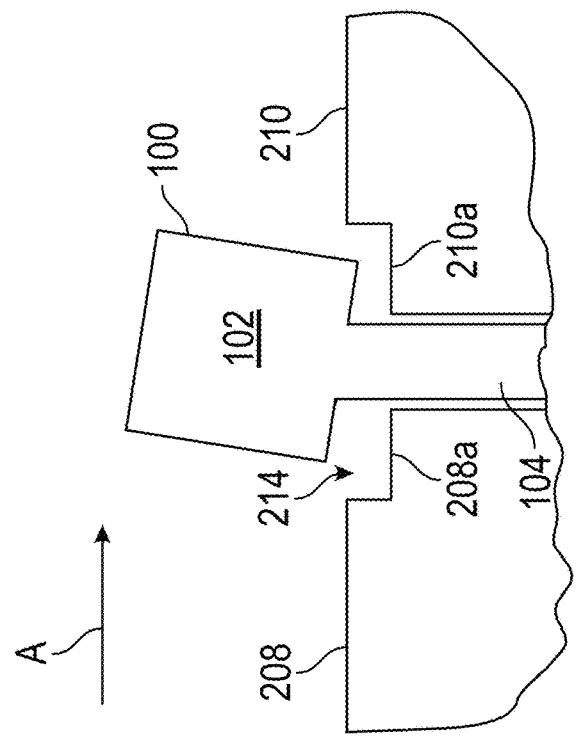

For example, with reference to FIGS. 5A and 5B, the outer portion 102 can move axially inboard (direction A) relative to the inner portion 104 as shown in FIG. 4A. FIG. 4B shows a situation where the outer portion 102 has moved axially outboard (direction A') relative to the inner portion 104. In both cases, the inner portion 104 is held in a substantially constant location due to it being captivated between the base portion 202 and the removable end portion 204 of the annular carrier 200 (see FIG. 2).

Referring back to FIGS. 3A and 3B, the sealing member 100 includes a central hole 105 formed in the inner portion 104. This central hole 105 can be sized and arranged such that surrounds the shaft 12 and, optionally, the sleeve member 20. The sealing member 100 can include one or more fastener holes 302 through which the fasteners can pass to join the base and removable end portions 202, 204 of the annular carrier 200. It shall be understood that the base and a removable end portions 202, 204 hold the inner portion 104 fixed relative to the annular carrier 200 as the outer portion 102 shifts. Such shifting can be relative to the rotating shaft 12. Of course, end regions of the inner portion 104 may slightly shift with the outer portion 102 but the vast majority is held immovable and herein shall be included when describing the inner portion 104 as immovable, fixed, or otherwise not shifting.

Figure 6:
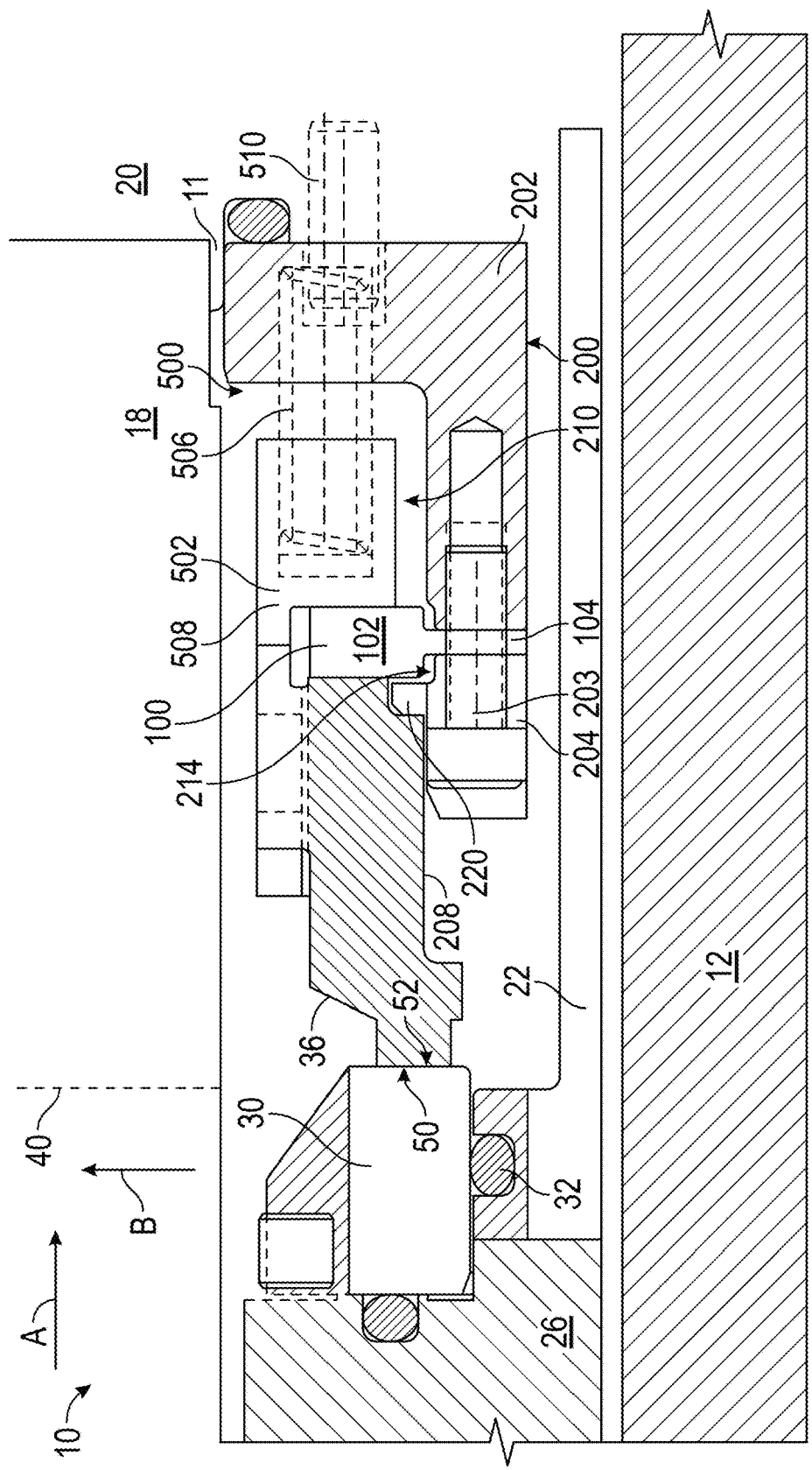
FIG. 6 shows is a cross-sectional view depicting a portion of a seal assembly according to an embodiment.
Figure 7:
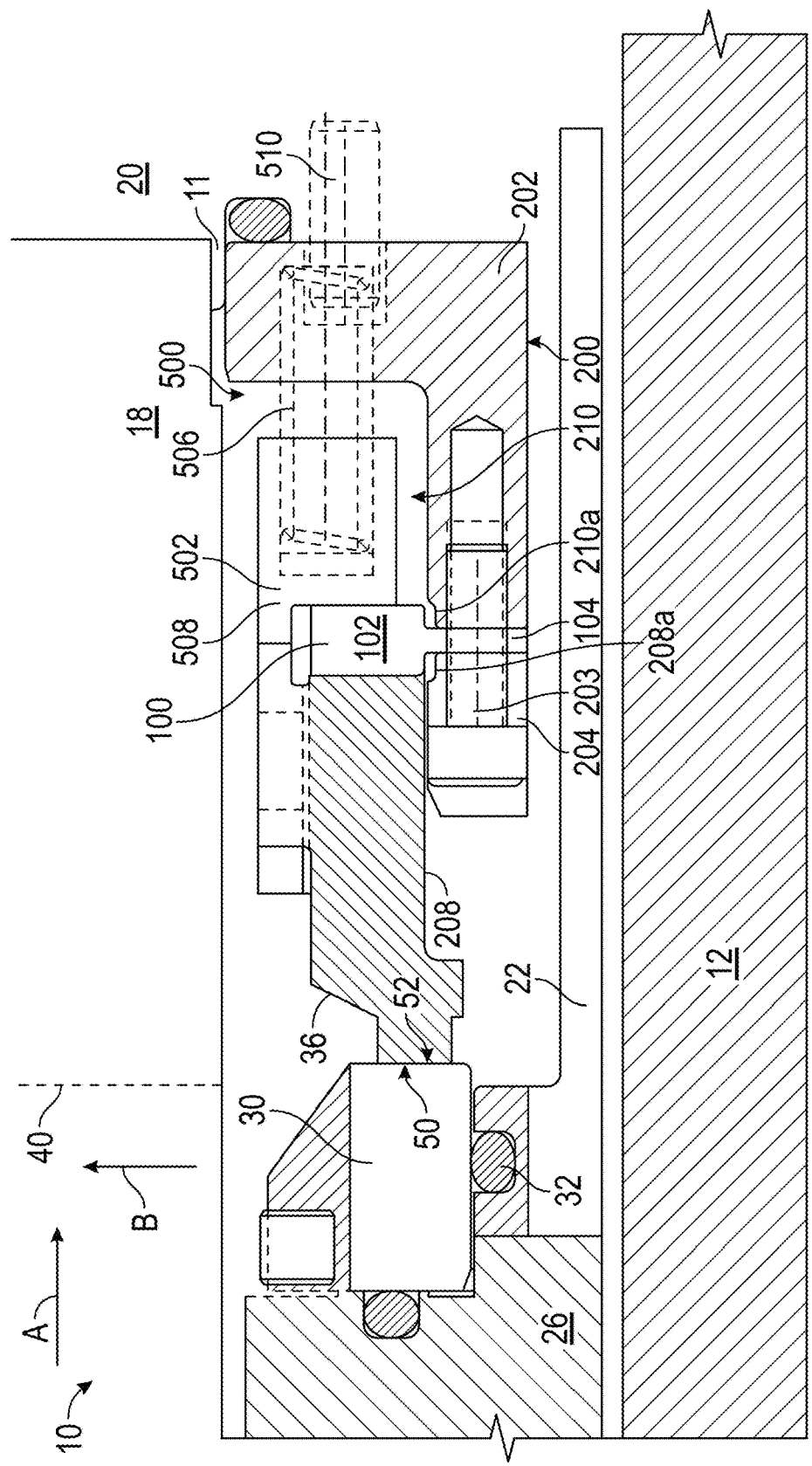
FIG. 7 shows is a cross-sectional view depicting a portion of a seal assembly according to an embodiment.

As discussed above, the depressions 208a/210a are optional and can be omitted as shown in FIG. 6. Further, the extrusion ring 220 can be omitted in some embodiments as shown in FIG. 7. It should be noted that the extrusion ring can be omitted in cases without and without the depressions.

Over the life of the seal, sealing faces 50 and 52 will wear relative to each other. Because sealing membrane 100 can move inboard, toward process chamber 14, and outward, away from process chamber 14, over the life of the seal, it can help to maintain an appropriate seal gap. Hydraulic pressure can keep the axially shiftable seal ring 36 from contacting axially fixed seal ring 30 while the outer portion 102 of sealing membrane 100 moves inboard. Biasing mechanism 500 can be used to set the working height of the seal and compress outer portion 102 of sealing membrane 100 against an end of the axially shiftable seal ring 36 (distal in relation to the process chamber, and opposite sealing face 52) of the axially shiftable seal ring 36 (creating a seal) when no hydraulic pressure is present. In some embodiments, due to the depressions, the vertical force may not be altered by the axial movement of sealing membrane 100, and the closing force at the interface of sealing faces 50 and 52 is not affected.

The maximum axially outboard translation of outer portion 102 and retainer 502 can be defined by a gap provided between an outboard face of retainer 502 and an inboard face 205 of carrier 200, or by the compression limit of biasing members 506. In embodiments, translation of outer portion 102 can be limited to prevent folding over, or other collapsing of sealing member 100

In addition, because outer portion 102 is held in a radially extending orientation by axially shiftable seal ring 36 and retainer 502, inner portion 104 is held in an axially extending orientation the base and removable end portions 202, 204 of the annular carrier 200, the sealing member 100 is non-collapsible.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A mechanical seal assembly adapted for arrangement around a rotating shaft of a rotating device, the mechanical seal assembly comprises:
   a first seal ring that, in operation, is axially shiftable relative to the rotating shaft;
   a second seal ring that, in operation, is axially fixed relative to the rotating shaft;
   an annular carrier having a base and a removable end portion configured to be affixed to a housing of the rotating device, wherein the axially shiftable first seal ring is proximate and axially shiftable relative to the annular carrier in response to axial movement of the rotating shaft and the axially fixed second seal ring, and wherein the axially shiftable first seal ring has an axially shiftable seal face that interfaces with an axially fixed seal face of the axially fixed second seal ring;
   a biasing mechanism that urges the axially shiftable first seal ring toward the axially fixed second seal ring to engage the axially shiftable seal face to the axially fixed seal face with a closing force;
   an annular flexible sealing membrane that defines a central hole comprising:
      an inner portion positioned between the base and the removable end portion of the annular carrier and that extends outwardly from the central hole; and
      an outer portion arrangeable between the axially shiftable first seal ring and the biasing mechanism, the outer portion being axially shiftable relative to the rotating shaft and extending outwardly from the inner portion; and
   a fastener passing axially through the inner portion of the annular flexible membrane and that attaches the base and the removable end portions such that the base and the removable end portions hold the inner portion fixed relative to the annular carrier as the outer portion shifts relative to the rotating shaft.

2. The mechanical seal assembly of claim 1, wherein the base has an upper surface with a depression formed therein that is arranged proximate the outer portion of the annular flexible sealing membrane.

3. The mechanical seal assembly of claim 2, wherein the removable end portion has an upper surface with a depression formed therein that is arranged proximate the outer portion of the annular flexible sealing membrane.

4. The mechanical seal assembly of claim 3, further comprising an anti-extrusion ring within a groove of the axially shiftable first seal ring.

5. The mechanical seal assembly of claim 1, wherein the outer portion presents a thicker cross-section than a cross-section of the inner portion.

6. The mechanical seal assembly of claim 1, wherein the biasing mechanism comprises an axially shiftable annular retainer proximate the outer portion and a plurality of radially spaced spring members arranged between the annular carrier and the retainer.

7. The mechanical seal assembly of claim 1, further comprising a rotating sleeve operably coupled to the rotating shaft for rotation therewith and wherein the axially fixed second seal ring is operably coupled to the sleeve.

8. The mechanical seal assembly of claim 7, wherein the axially fixed second seal ring is operably coupled to the sleeve by a plurality of pins.

9. The mechanical seal assembly of claim 1, wherein the sealing membrane comprises a flexible elastomer.

10. The mechanical seal assembly of claim 9, further comprising an anti-extrusion ring within a groove of the axially shiftable first seal ring.

11. The mechanical seal assembly of claim 10, wherein the anti-extrusion ring comprises a material of a greater hardness than the flexible elastomer of the sealing membrane.

12. The mechanical seal assembly of claim 1, further comprising:
   a gland plate adapted to connect to the housing;
   wherein the carrier is connected to the gland plate.

\* \* \* \* \*